United States Patent
Brown et al.

(10) Patent No.: US 10,207,697 B2
(45) Date of Patent: Feb. 19, 2019

(54) MOVABLE STEERING WHEEL FOR AUTONOMOUS VEHICLE

(71) Applicant: Ford Global Technologies, LLC, Dearborn, MI (US)

(72) Inventors: Andrew Brown, Canton, MI (US); John P. Joyce, West Bloomfield, MI (US); Scott J. Lauffer, Northville, MI (US); Steven R. El Aile, Sterling Heights, MI (US); Samer Abbas, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 461 days.

(21) Appl. No.: 14/976,136

(22) Filed: Dec. 21, 2015

(65) Prior Publication Data
US 2017/0174203 A1   Jun. 22, 2017

(51) Int. Cl.
| | | |
|---|---|---|
| *B60W 10/20* | (2006.01) | |
| *B60R 21/205* | (2011.01) | |
| *B60W 10/30* | (2006.01) | |
| *G05B 19/042* | (2006.01) | |
| *B60R 21/09* | (2006.01) | |

(52) U.S. Cl.
CPC ............ *B60W 10/20* (2013.01); *B60R 21/09* (2013.01); *B60R 21/205* (2013.01); *B60W 10/30* (2013.01); *G05B 19/042* (2013.01); *G05B 2219/2637* (2013.01)

(58) Field of Classification Search
None
See application file for complete search history.

(56) References Cited

U.S. PATENT DOCUMENTS

| | | | | |
|---|---|---|---|---|
| 3,429,196 A | * | 2/1969 | White | B62D 1/192 74/493 |
| 3,983,952 A | | 10/1976 | McKee | |
| 5,769,454 A | * | 6/1998 | Duval | B62D 1/197 280/777 |
| 6,070,686 A | * | 6/2000 | Pollmann | B60R 25/0221 180/287 |
| 6,685,224 B2 | * | 2/2004 | Pardonnet | B62D 1/18 280/775 |

(Continued)

FOREIGN PATENT DOCUMENTS

| | | | |
|---|---|---|---|
| DE | 19860804 A1 * | 7/2000 | ......... B60R 21/2032 |
| WO | WO 03020571 A1 | 3/2003 | |

OTHER PUBLICATIONS

Foreign translation of DE-19860804-A1 (Year: 2000).*
GB Search Report dated Jun. 8, 2017.

*Primary Examiner* — Kimberly S Berona
*Assistant Examiner* — Michael F Whalen
(74) *Attorney, Agent, or Firm* — Frank A. MacKenzie; Bejin Bieneman PLC

(57) ABSTRACT

A steering wheel position control system for a vehicle comprises a controller for a vehicle. The controller includes a processor and a memory. The memory stores instructions executable by the processor. The controller is programmed to receive values from the sensors. The controller commands a pivot mechanism to bias a steering wheel to a stowed position based on values from the sensors. The controller also deploys an air bag based on values from the sensors, wherein the steering wheel is pivoted out of a space envelope of the deployed airbag.

18 Claims, 4 Drawing Sheets

(56) References Cited

U.S. PATENT DOCUMENTS

| | | | |
|---|---|---|---|
| 7,862,084 B2 | 1/2011 | Maeda et al. | |
| 9,073,574 B2 * | 7/2015 | Cuddihy | B62D 1/183 |
| 9,108,584 B2 * | 8/2015 | Rao | B60R 21/017 |
| 9,828,016 B2 * | 11/2017 | Lubischer | B60R 21/203 |
| 2003/0227159 A1 * | 12/2003 | Muller | B60R 21/203 280/731 |
| 2004/0016588 A1 * | 1/2004 | Vitale | B60K 37/00 180/322 |
| 2004/0046379 A1 * | 3/2004 | Riefe | B62D 1/181 280/777 |
| 2007/0241548 A1 * | 10/2007 | Fong | B60R 21/09 280/777 |
| 2007/0295151 A1 * | 12/2007 | Kentor | B62D 1/06 74/552 |
| 2009/0173180 A1 * | 7/2009 | Andersson | B62D 1/18 74/493 |
| 2014/0028008 A1 * | 1/2014 | Stadler | B62D 1/192 280/777 |
| 2015/0137492 A1 * | 5/2015 | Rao | B60R 21/017 280/729 |
| 2015/0142246 A1 * | 5/2015 | Cuddihy | B62D 1/183 701/23 |
| 2016/0121918 A1 | 5/2016 | Soderlind | |
| 2016/0368522 A1 * | 12/2016 | Lubischer | B62D 1/181 |
| 2016/0375860 A1 * | 12/2016 | Lubischer | B60R 21/203 74/493 |
| 2017/0275003 A1 * | 9/2017 | Erhel | B64D 11/0641 |

\* cited by examiner

MOVABLE STEERING WHEEL FOR AUTONOMOUS VEHICLE

BACKGROUND

In an autonomous vehicle capable of driving from one location to another without one or more inputs typically provided by a human operator, e.g., steering, a steering wheel is no longer needed to pilot the vehicle. However, present vehicles typically rely on a steering wheel for housing a driver-side airbag. Further, even in an autonomous vehicle intended to be driven entirely without human operator steering input, the lack of a steering wheel and the associated inability to manually steer the vehicle can result in a potential stranding of the vehicle and/or a dangerous inability for an operator to assume control, e.g., upon a loss of autonomous function due to weather and other reasons.

DETAILED DESCRIPTION

A movable steering wheel can be moved between a driving position and a stowed position. The movable steering wheel has no airbag. Therefore, a driver-side airbag is mounted in a location other than on the steering wheel, such as a roof location or a dashboard location. A driver side arrangement symmetrical with that of the front passenger side could be employed for driver side airbag location and design. Such commonality would reduce development costs by enabling a single crash safety analysis/program to be done with the steering wheel in either position. Another benefit of such a system is the ability to easily move the steering wheel into the driving position to enable manual operation of the vehicle when manual operation is needed or desired.

Relative orientations and directions (by way of example, upper, lower, bottom, rearward, front, rear, back, outboard, inboard, inward, outward, let, right) are set forth in this description not as limitations, but for the convenience of the reader in picturing at least one embodiment of the structures described.

Figure 1:
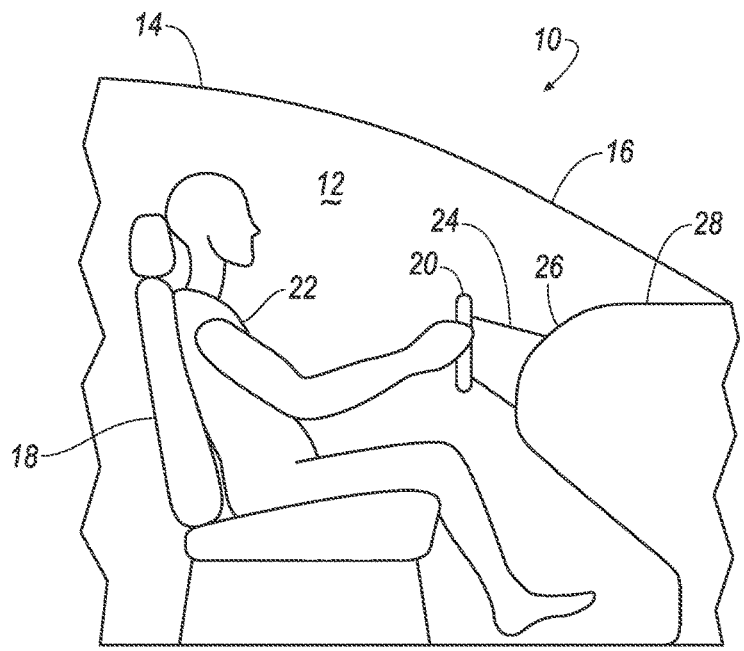
FIG. 1 is a schematic side view of an exemplary interior seat and steering wheel arrangement of a vehicle with a steering wheel in a first position.
Figure 2:
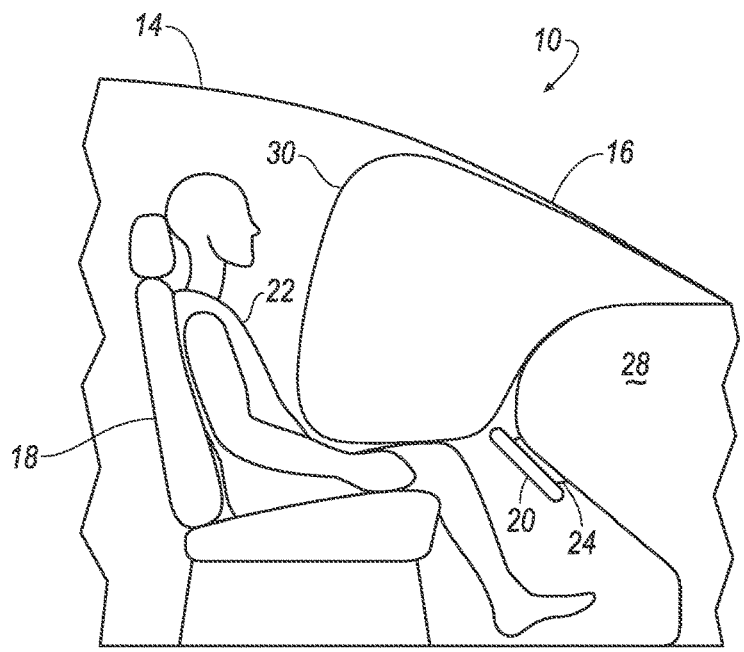
FIG. 2 is a schematic side view of the exemplary interior seat and steering wheel arrangement of FIG. 1 with the steering wheel in a second position and an air bag deployed.
Figure 3:
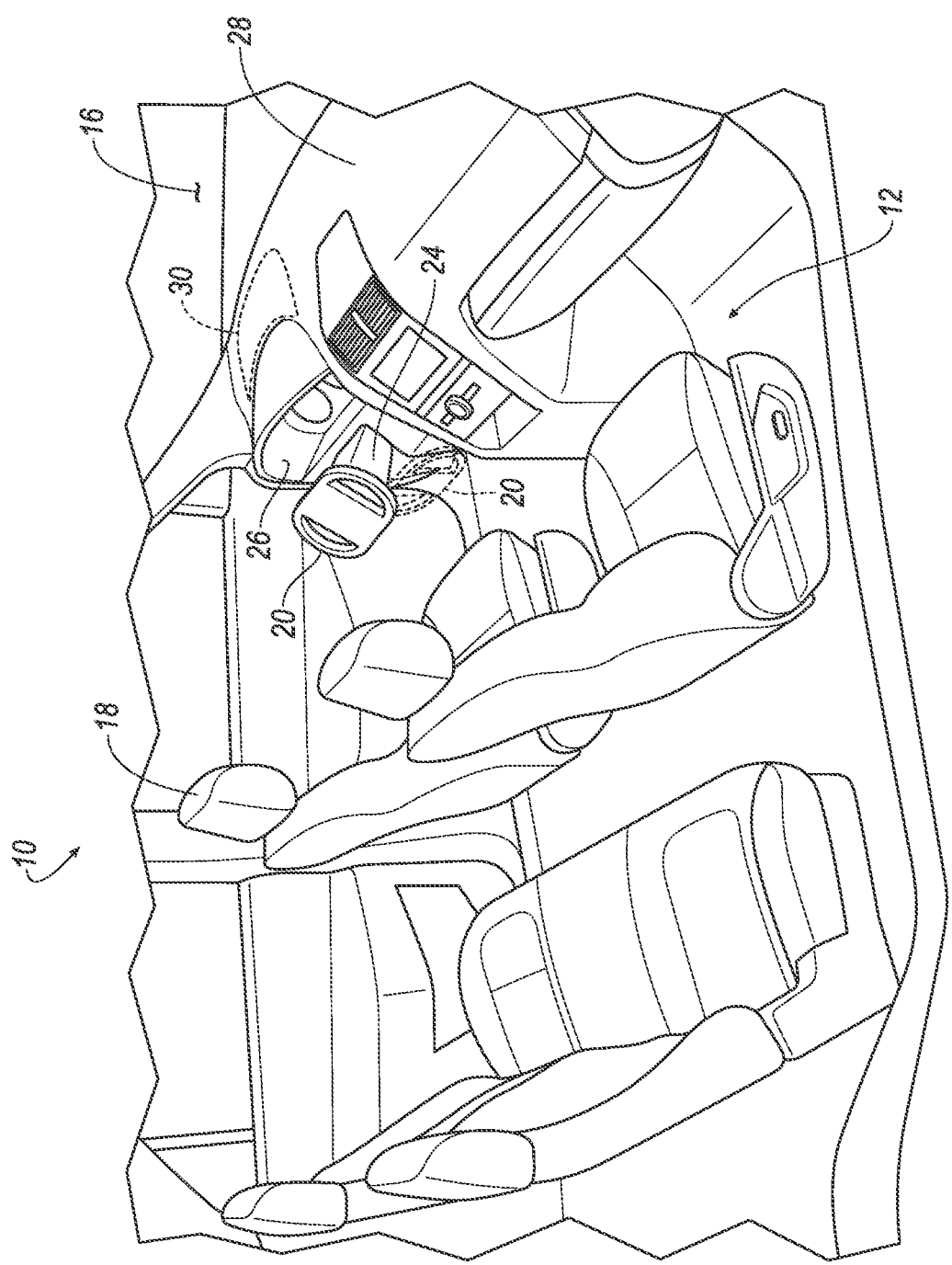
FIG. 3 is a perspective view of the exemplary interior seat and steering wheel arrangement of FIG. 1.

FIG. 1 and FIG. 2 show a portion of an exemplary vehicle 10 with a passenger cabin 12 defined in part by a roof 14 and a windshield 16. An exemplary driver seat 18 and an exemplary stowable steering wheel 20 are located in passenger cabin 12 with seat 18 oriented in a conventional forward-facing direction. Steering wheel 20 is illustrated in a driving position. A driver or occupant 22 is illustrated in seat 18.

Figure 4:
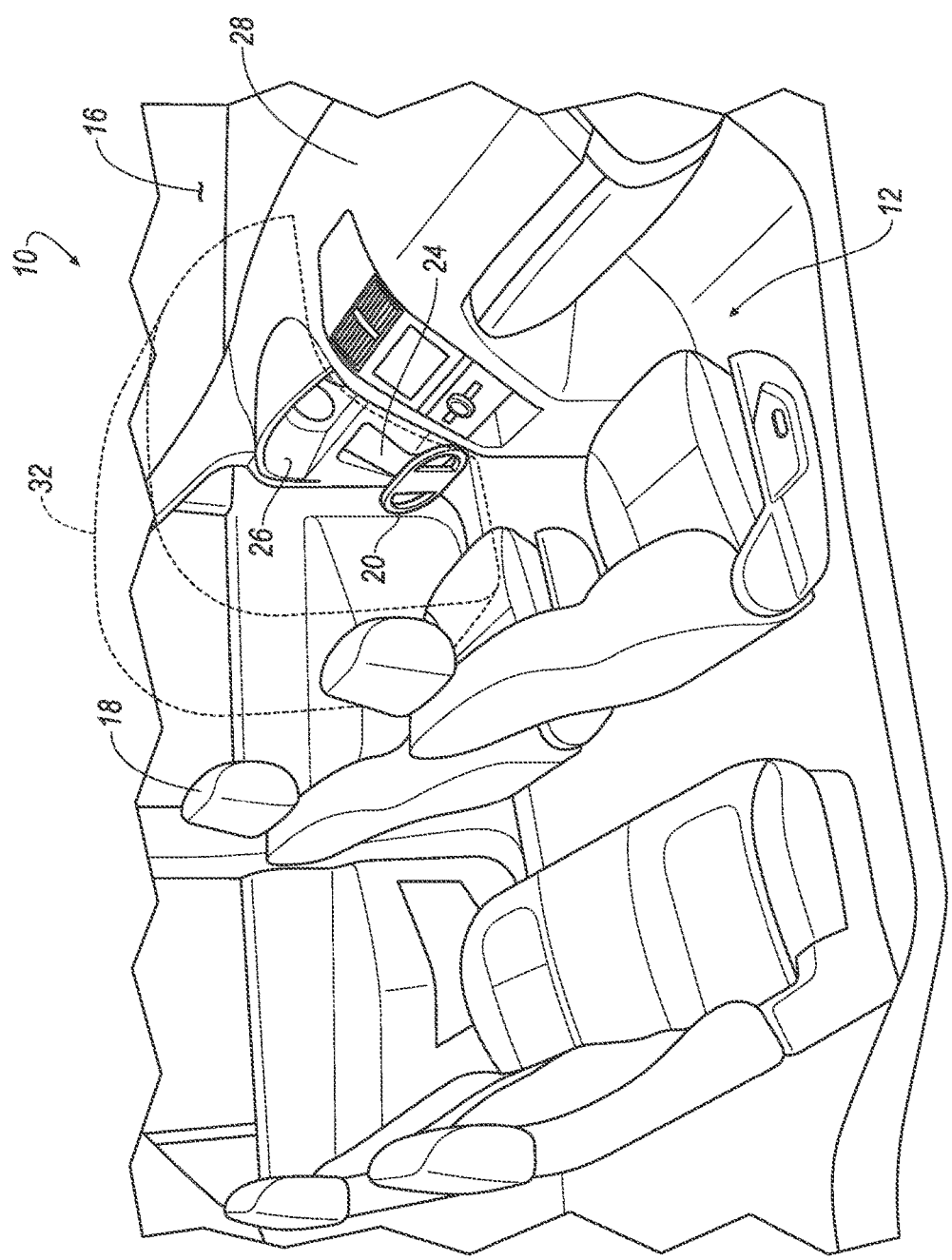
FIG. 4 is a perspective view of the exemplary interior seat and steering wheel arrangement of FIG. 2 with the steering wheel in a second position and an air bag deployed.
Figure 5:
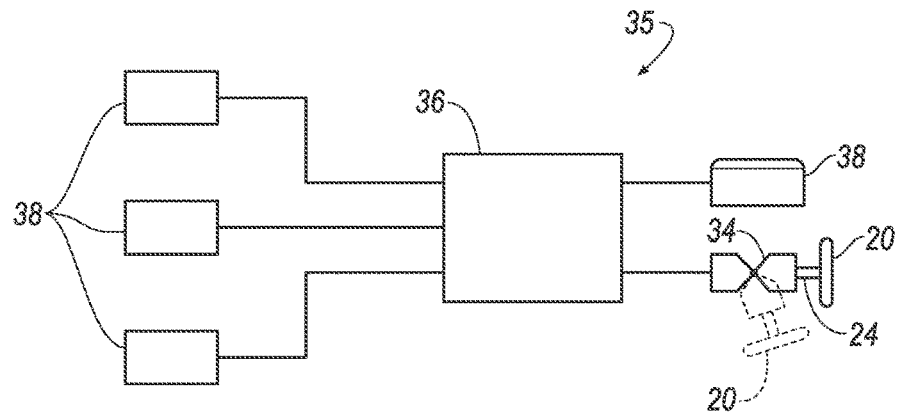
FIG. 5 is a schematic of an exemplary steering wheel position control system.

Steering wheel 10 is fixed to a steering support module 24 extending from an instrument panel region 26 of a dashboard 28. A driver airbag 30 shown in FIG. 2 and FIG. 4 in its deployed mode is located in the vehicle dashboard 28 as shown in FIG. 4 or alternatively in the roof rather than steering wheel 20. The volume taken up by the deployed airbag 30 may be characterized as a space envelope 32 of airbag 30, shown in phantom in FIG. 4. Steering wheel 20 and steering support module 24 can be pivoted away from the reach of driver 22, to a stowed position on a lower side of the dashboard when not needed as illustrated in FIG. 2. Steering wheel 20 can also be moved back to the place illustrated in FIG. 1, within the driver's reach. A pivot mechanism 34, shown in the exemplary schematic of FIG. 5 illustrating an exemplary steering wheel position control system 35, disposed between module 24 and dashboard 28 enables steering support module 24 to sustain and transmit driver torque to the vehicle's steering gear (not shown) when module 24 and steering wheel 20 are in the driving position. In one example of a pivot mechanism 34, steering wheel and support module 24 are spring-biased toward the stowed position. A selectively disengageable latch (not shown) of pivot mechanism 34 retains the spring biased steering support module in the driving position. One exemplary embodiment employs an electromechanically displaceable latch. The latch can be disengaged electronically by an electrically controlled actuator (not shown). Pivot mechanism 34, more specifically the actuator, is electrically connected to an electronic control unit 36. Steering wheel 20 is restored to the driving position by lifting steering wheel 20 up against the spring load until engagement of the latch is achieved.

If the vehicle steering is provided by a conventional mechanical steering linkage, an exemplary module 24 includes an upper portion of a steering column. Alternatively, if the steering system is a steer-by-wire system, an exemplary module includes a combination of a feedback motor, sensors 38, and a bearing-mounted stub shaft. Each type of steering system would require a distinct pivot mechanism 34. Further details of the pivot mechanism 34 are not needed in this disclosure because a functional pivot mechanism is within the range of skill of one skilled in the art to provide.

Steering wheel 20 is smaller in size than most conventional steering wheels, with a maximum outer radius of approximately five inches in one exemplary embodiment. Steering wheel 20 can be oval or yoke shaped to further reduce its size. When steering wheel 20 pivots to the stowed position, it can be disconnected from the steering system to enable storage in a predetermined rotational orientation independent of the steering orientation of the vehicle wheels, and reoriented when the steering wheel is restored to the driving position. If the steering system is a steer-by-wire system, the above-described disconnect and subsequent reconnection can be achieved through controller software as discussed below. If the steering system is a conventional mechanical steering linkage, an exemplary clutch connection could be employed in which a clutch (not shown) is released in the stowed position and engaged in the drive position. Engagement and disengagement of the clutch is achieved with the pivoting of module 24.

Steering wheel 20 and module 24 drop and pivot downward to the stowed position, a location on a lower side of the dashboard 28, when deployment of driver airbag 30 is anticipated or underway. Steering wheel 20, if in the driving position, drops out of the way of airbag 30 to allow deployment of airbag 30. When stowed, steering wheel 20 and module 24 do not interfere with the deployment of airbag 30. The driver, when seated in an upright position, is not able to reach steering wheel 20 when it is in the pivoted, stowed position.

The steering system is electrically connected to, and/or may be understood as including, the electronic control unit 36, alternatively characterized as a controller or a computer. Electronic control unit 36 is also electrically connected to the airbag, and to sensors 38 which can include, by way of example, seat weight load sensors, vehicle speed sensors, accelerometers indicating changes in vehicle speed as may be indicative of an impact event, and seat position sensors. Sensors 38 provide electrical signals to electronic control 36 unit indicative of their respective parameters. While FIG. 5 includes lines indicative of the electrical connections being provided by wires, such electronic connections may alternatively be made without wire using wireless communications technology.

The electronic control unit 36 includes at least one electronic processor and associated memory. The processor's operating system software is stored in memory for access by the processor. Also, control software for executing certain predetermined tasks is maintained in memory. The memory also includes a buffer region, or more simply a buffer, facilitating the storage and manipulation of data. The precise structure of electronic control unit 36 is not critical to the present description and is within the knowledge of those skilled in the art. Electronic control unit 36 is programmed by control software to cause steering wheel 20 and module 24 to pivot to the stowed position responsive to data from sensors 38 that is determined by electronic control unit 36 to be indicative of an impact event. In an exemplary embodiment, the pivoting of steering wheel 20 and module 24 to the stowed position occurs when the actuator of pivot mechanism 34 displaces the latch to a disengaged position, allowing a spring bias on module 24 to pivot module 24 and steering wheel 20 from the drive position to the stowed position. Electronic control unit 36 is also programmed by software to deploy the driver airbag 30 responsive to data from sensors 38 determined by electronic control unit 36 to be indicative of an impact event.

Figure 6:
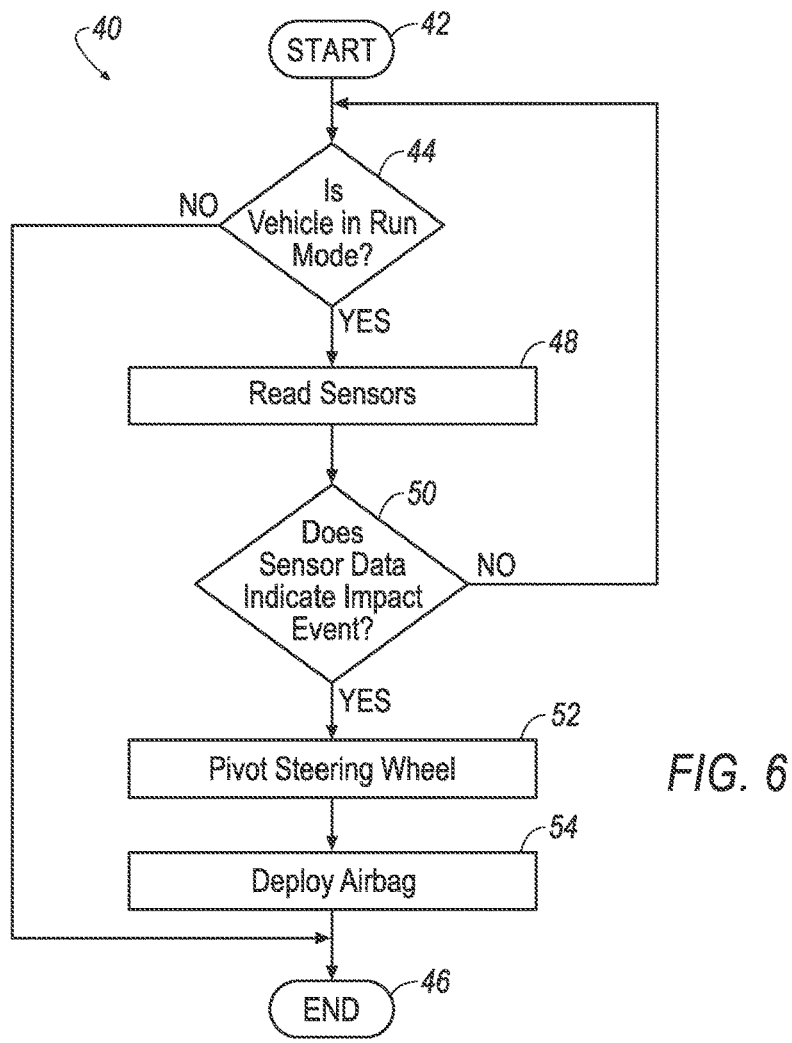
FIG. 6 is a flow chart of exemplary logic for the steering wheel position control system of FIG. 5.

The exemplary logic of FIG. 6 illustrates steps for a method of moving or positioning steering wheel 20. A program 40 is initiated with start block 42. In decision block 44, a determination is made, based on signals available to electronic control unit 36, on whether the vehicle is in a "Run" mode of operation. When the vehicle is determined to not be in the run mode, program 40 moves to an end block 46. When the vehicle is determined to be in the run mode, program 40 moves to process block 48. Process block 48 directs electronic control unit 36 to read a value of at least one sensor 38. Upon reading sensor 38 in accord with process block 48, program 40 moves to decision block 50. Decision block 50 determines whether, based on the value from sensor 38, an impact event has occurred. When occurrence of an impact event is not determined, the program moves back to decision block 44. When the occurrence of an impact event is determined, the program moves to blocks 52 and 54 to deploy airbag 30 and pivot steering wheel 20. The sequencing of pivoting and deployment is established to ensure that steering wheel 20 does not interfere with the deployment of airbag 30, and does not pose an impingement risk to driver 22. For example, airbag 30 may be deployed simultaneously with, or even before steering wheel 20 is pivoted if it is known that steering wheel 20 will clear space envelope 30 before airbag 30 is fully deployed.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A steering wheel position control system for a vehicle comprising:
   a processor;
   a memory storing instructions executable by the processor to:
   receive values from at least one sensor;
   command a pivot mechanism to bias a steering wheel from a driving position to a stowed position based on values from the sensor;
   deploy an airbag based on values from the sensor; and
   wherein the steering wheel in the stowed position is on a lower side of a dashboard and is out of a space envelope of the deployed airbag such that a driver in a seated upright position is not able to reach the steering wheel.

2. The position control system of claim 1 wherein a spring load biases the steering wheel toward the stowed position.

3. The position control system of claim 2 wherein the steering wheel is retained in the drive position by an electromechanically displaceable latch having an engaged position in which the latch resists movement of the steering wheel to the stowed position and a disengaged position in which the latch permits movement of the steering wheel to the stowed position and moves to the disengaged position responsive to the command to the pivot mechanism.

4. The position control system of claim 1 wherein the steering wheel has a maximum outer radius of five inches.

5. The position control system of claim 1 wherein the airbag is disposed in a dashboard.

6. The position control system of claim 1, wherein the steering wheel is restored to the driving position by lifting steering wheel after the pivot mechanism biases the steering wheel to the stowed position.

7. The position control system of claim 1, wherein the steering wheel in the stowed position is between the dashboard and a floor of the vehicle.

8. The position control system of claim 1, wherein the steering wheel in the stowed position faces downward relative to the vehicle.

9. A steering wheel position control system for a vehicle comprising:
   a steering wheel exclusive of an airbag therein;
   the steering wheel being fixed to a steering wheel module, the module being selectively pivotable with respect to a dashboard between a driving position with the steering wheel within reach of an occupant in a driver seat and a stowed position with the steering wheel out of reach of the occupant;
   a processor;
   a sensor to detect a vehicle impact event;

a pivot mechanism selectively biasing the steering wheel to the stowed position responsive to a command signal from the processor; and a memory storing instructions executable by the processor to:

receive values from the sensor;

command to the pivot mechanism to bias the steering wheel from the driving position to the stowed position based on values from the sensor; and deploy the airbag based on values from the sensor;

wherein the steering wheel in the stowed position is on a lower side of the dashboard and is pivoted out of a space envelope of the deployed airbag such that a driver in a seated upright position is not able to reach the steering wheel.

10. The position control system of claim 9 wherein a spring load biases the steering wheel toward the stowed position.

11. The position control system of claim 10 wherein the steering wheel is retained in the drive position by an electromechanically displaceable latch having an engaged position in which the latch resists movement of the steering module to the stowed position and a disengaged position in which the latch permits movement of the steering module to the stowed position and moves to the disengaged position responsive to the command to the pivot mechanism.

12. The position control system of claim 9 wherein the steering wheel has a maximum outer radius of five inches.

13. The position control system of claim 9 wherein the airbag is disposed in the dashboard.

14. A method for positioning a steering wheel comprising:

receiving values from a sensor;

commanding a pivot mechanism to bias a steering wheel from a driving position to a stowed position based on values from the sensor; and deploying an airbag based on values from the sensor;

wherein the steering wheel in the stowed position is on a lower side of a dashboard and is pivoted out of a space envelope of the deployed airbag such that a driver in a seated upright position is not able to reach the steering wheel.

15. The method of claim 14 further comprising employing a spring to bias the steering wheel toward the stowed position.

16. The method of claim 15 further comprising retaining the steering wheel in the drive position with an electromechanically displaceable latch having an engaged position in which the latch resists movement of the steering wheel to the stowed position, and a disengaged position in which the latch permits movement of the steering wheel to the stowed position, and actuating the latch responsive to commands to the pivot mechanism.

17. The method of claim 14 further comprising forming the steering wheel with a maximum outer radius of five inches.

18. The method of claim 14 further comprising providing the airbag in the dashboard.

* * * * *

UNITED STATES PATENT AND TRADEMARK OFFICE
CERTIFICATE OF CORRECTION

PATENT NO. : 10,207,697 B2
APPLICATION NO. : 14/976136
DATED : February 19, 2019
INVENTOR(S) : Andrew Brown et al.

Page 1 of 1

It is certified that error appears in the above-identified patent and that said Letters Patent is hereby corrected as shown below:

In the Claims

Column 4, Line 30, Claim 1:   insert --pivoted-- after "and is".

Signed and Sealed this
Nineteenth Day of November, 2019

Andrei Iancu
*Director of the United States Patent and Trademark Office*